US012441583B2

(12) United States Patent
Kagerer

(10) Patent No.: US 12,441,583 B2
(45) Date of Patent: Oct. 14, 2025

(54) SAFETY APPARATUS FOR DETECTING A MEDICAL EMERGENCY IN A PASSENGER ELEVATOR

(71) Applicant: CEDES AG, Landquart (CH)

(72) Inventor: Bernd Kagerer, Duesseldorf (DE)

(73) Assignee: CEDES AG, Landquart (CH)

( * ) Notice: Subject to any disclaimer, the term of this patent is extended or adjusted under 35 U.S.C. 154(b) by 0 days.

(21) Appl. No.: 18/967,776

(22) Filed: Dec. 4, 2024

(65) Prior Publication Data

US 2025/0187871 A1 Jun. 12, 2025

(30) Foreign Application Priority Data

Dec. 11, 2023 (EP) .................................... 23215575

(51) Int. Cl.
*B66B 5/00* (2006.01)
*B66B 1/34* (2006.01)

(52) U.S. Cl.
CPC .......... *B66B 5/0012* (2013.01); *B66B 1/3446* (2013.01); *B66B 1/3476* (2013.01)

(58) Field of Classification Search
CPC .... B66B 1/24; B66B 1/26; B66B 1/28; B66B 1/30; B66B 1/304; B66B 1/32; B66B 1/34; B66B 1/3415; B66B 1/3423; B66B 1/3446–3484; B66B 5/00–0012
See application file for complete search history.

(56) References Cited

U.S. PATENT DOCUMENTS

| | | | | |
|---|---|---|---|---|
| 10,294,072 | B2 * | 5/2019 | Zhao | B66B 25/00 |
| 2008/0116017 | A1 * | 5/2008 | Kress | B66B 1/3484 187/392 |
| 2019/0047819 | A1 * | 2/2019 | Vaunois | B66B 5/0012 |
| 2022/0185625 | A1 * | 6/2022 | One | B66B 1/34 |
| 2025/0162838 | A1 * | 5/2025 | Lee | B66B 5/025 |

FOREIGN PATENT DOCUMENTS

| | | | |
|---|---|---|---|
| CN | 110002309 | A | 7/2019 |
| CN | 111559682 | A | 8/2020 |
| CN | 113830639 | A | 12/2021 |
| WO | 2020/062627 | A1 | 4/2020 |

OTHER PUBLICATIONS

Extended European Search Report (Application No. 23215575.4) dated May 23, 2024 (with English translation) (10 pages).

* cited by examiner

*Primary Examiner* — Christopher Uhlir
(74) *Attorney, Agent, or Firm* — BURR PATENT LAW, PLLC

(57) ABSTRACT

Safety apparatus for an elevator having an elevator car having a presence determination device for determining that one and only one person is present in the elevator car, having a position determination device for determining that the person is in a lying or crouching position and the length of time since the lying or crouching position occurred, and having a relay device for relaying a signal to a supervisory authority. In this scenario, the relay device relays the signal when the presence determination device determines that there is just a single person in the elevator car and the position determination device determines that the person is in the lying or crouching position and a specific length of time has elapsed since the lying or crouching position occurred.

5 Claims, 1 Drawing Sheet

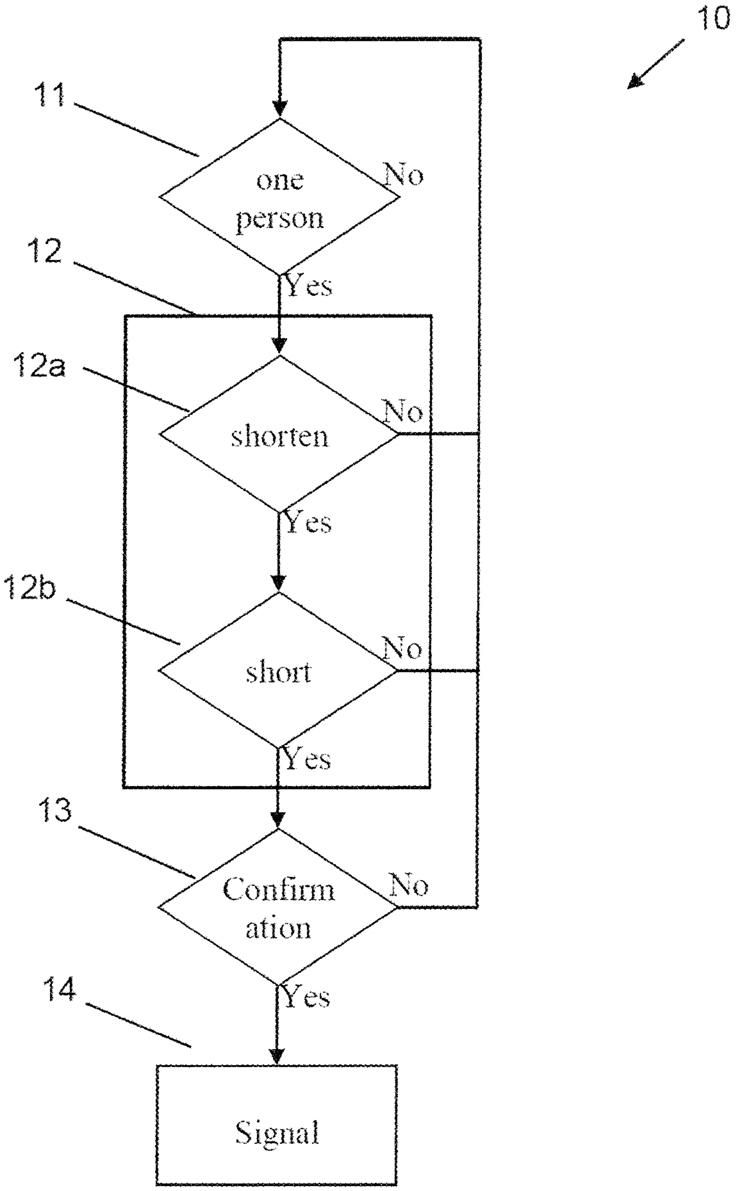
10
11
one person
No
12
Yes
12a
shorten
No
Yes
12b
short
No
Yes
13
Confirmation
No
Yes
14
Signal

SAFETY APPARATUS FOR DETECTING A MEDICAL EMERGENCY IN A PASSENGER ELEVATOR

This application claims the benefit under 35 USC § 119(a)-(d) of European Application No. 23 215 575.4 filed Dec. 11, 2023, the entirety of which is incorporated herein by reference.

FIELD OF THE INVENTION

The present invention relates to a safety apparatus for an elevator for when a person in the elevator suffers a medical emergency.

BACKGROUND OF THE INVENTION

The prior art discloses safety apparatuses of the type mentioned that provide an alarm button in the elevator car for when a person in the elevator car has a medical emergency.

SUMMARY OF THE INVENTION

It is the object of the present invention to provide an improved safety apparatus of the type mentioned.

The safety apparatus according to the present invention is a safety apparatus for an elevator having an elevator car having a presence determination device for determining that one and only one person is present in the elevator car, having a position determination device for determining that the person is in a lying or crouching position and the length of time since the lying or crouching position occurred, and having a relay device for relaying a signal to a supervisory authority. In this scenario, the relay device relays the signal when the presence determination device determines that there is just a single person in the elevator car and the position determination device determines that the person is in the lying or crouching position and a specific length of time has elapsed since the lying or crouching position occurred.

The safety apparatus can afford the advantage that passenger safety is increased and/or an automated alert is provided, and/or that misuse is prevented, thereby allowing costs to be saved.

The presence determination device can be a 2D or 3D camera in the elevator car that monitors the space in the elevator car and that has an image recognition system that identifies persons and the number of persons. The presence determination device can be a 2D or 3D camera that monitors the entrance to the elevator car and identifies persons and their direction of movement into or out of the elevator cars and that uses the directions of movement to calculate the number of persons in the elevator. The presence determination device can be a system that uses an accelerometer to measure the horizontal movement of the car when a person gets into or leaves the elevator car and that uses the number of entrances and exits to calculate the number of persons in the elevator car. The presence determination device can be a system comprising two light barriers, positioned in the doorway of the entrance to the elevator car one behind the other in the direction of passage, that detects the direction of movement of a person's entrance or exit into or out of the elevator car by virtue of the time offset of the detection and that uses the entrance or exit count to determine the number of persons in the elevator car.

The position determination device can be a 2D or 3D camera that monitors the space in the elevator car and that has an image recognition system that identifies the height extent or the lying position of a person. The position determination device can be a light curtain or a radar sensor in the elevator car that monitors a plane parallel to the floor at a specific height and, in the event of nondetection or a change from detection to nondetection, determines that a person in the elevator car is in a lying or crouching position.

The relay device can be a wired or wireless relay device.

Preferably, the safety apparatus comprises a timer that determines the length of time from the time since the position determination device determined that the person is in a lying or crouching position.

Preferably, the position determination device determines that the person is in the lying or crouching position by virtue of there having been a drop below a first threshold for the height of the person.

This can increase the reliability of the safety apparatus.

Preferably, the position determination device determines that the person is in the lying or crouching position by virtue of its determining a change in the height of the person by a specific second threshold since they entered the car.

This can increase the reliability of the safety apparatus.

Preferably, the safety apparatus has an inquiry device in order to question the person about their condition and to take the response or the absence of a response as a basis for relaying or not relaying the signal.

The inquiry device can be an intercom that is initially activated instead of the signal. The inquiry device can be an automatic inquiry that requests confirmation of the emergency. The inquiry device can be a camera that is initially activated instead of the signal. The inquiry device can comprise an intercom and a camera.

This can increase the reliability of the safety apparatus.

Preferably, the safety apparatus has a tracking device that tracks the position of a person in the elevator car and relays the position to the position determination device.

This can increase the reliability of the safety apparatus.

The advantages mentioned in each case can also be attained for combinations of features in connection with which they are not mentioned.

BRIEF DESCRIPTION OF THE DRAWINGS

Exemplary embodiments of the present invention are shown in the drawings and are explained in more detail hereinbelow. Identical reference signs in the individual FIGURES denote elements that correspond to one another.

FIG. 1 shows a flowchart for the safety apparatus.

DETAILED DESCRIPTION OF THE INVENTION

FIG. 1 shows a flowchart for the safety apparatus 10. The sequence starts at the presence determination device 11.

The presence determination device determines whether there is one and only one person in the elevator car. If there are no persons or multiple persons in the elevator car, the sequence begins with the presence determination device 11 again. If the presence determination device detects one and only one person in the elevator car, however, the flow moves on to the position determination device 12.

The position determination device 12 determines, in a first step 12*a*, whether the height extent of the person has decreased since they entered the elevator car and, if necessary, in a second step 12*b*, whether the height extent of the person has dropped below a minimum value. If the position determination device does not detect that the height extent of the person has decreased since they entered the elevator car or that the height extent of the person has dropped below a minimum value, the sequence returns to the presence determination device 11 again. If, however, the position determination device detects that the height extent of the person has decreased since they entered the elevator car and the height extent of the person has dropped below a minimum value, the sequence moves on to the enquiry device 13.

The enquiry device 13 questions the person about their condition via a loudspeaker and picks up the response from the person via a microphone. If the person denies an emergency, the sequence begins with the presence determination device 11 again. If the person confirms the emergency or if there is no response, the sequence moves on to the relay device 14.

The relay device 14 transmits an alarm signal wirelessly to a server via the Internet. The server informs a service company, which initiates rescue measures.

LIST OF REFERENCE SIGNS

10 flowchart for the safety apparatus
11 presence determination device
12 position determination device
12*a* first step of the position determination device
12*b* second step of the position determination device
13 enquiry device
14 relay device

The invention claimed is:

1. A safety apparatus for an elevator having an elevator car having a presence determination device for determining that only one person is present in the elevator car, having a position determination device for determining that the person is in a lying or crouching position and a length of time since the lying or crouching position occurred, and having a relay device for relaying a signal to a supervisory authority, wherein the relay device relays the signal when the presence determination device determines that there is only a single person in the elevator car and the position determination device determines that the person is in the lying or crouching position and a specific length of time has elapsed since the lying or crouching position occurred, and wherein the position determination device determines that the person is in the lying or crouching position by virtue of there having been a drop below a first threshold for a height of the person.

2. The safety apparatus according to claim 1, wherein the safety apparatus comprises a timer that determines the length of time from a time since the position determination device determined that the person is in a lying or crouching position.

3. The safety apparatus according to claim 1, wherein the position determination device determines that the person is in the lying or crouching position by virtue of its determining a change in the height of the person by a specific second threshold since they entered the car.

4. The safety apparatus according to claim 1, wherein the safety apparatus has an inquiry device in order to question the person about their condition and to take a response or the absence of a response as a basis for relaying or not relaying the signal.

5. The safety apparatus according to claim 1, wherein the safety apparatus has a tracking device that tracks a position of a person in the elevator car and relays the position to the position determination device.

* * * * *